United States Patent [19]
Dunstan

[11] 4,448,347
[45] May 15, 1984

[54] HEAT PUMP SYSTEM USING WASTEWATER HEAT

[76] Inventor: Phillip E. Dunstan, 1022 S. 208th St., Seattle, Wash. 98148

[21] Appl. No.: 328,905

[22] Filed: Dec. 9, 1981

[51] Int. Cl.³ .......................................... G05D 23/00
[52] U.S. Cl. .................................. 237/2 B; 62/238.7; 165/DIG. 12
[58] Field of Search ........................... 62/238.6, 238.7; 165/DIG. 12; 237/2 B

[56] References Cited

U.S. PATENT DOCUMENTS

| | | | |
|---|---|---|---|
| 2,696,085 | 12/1954 | Ruff | 62/238.6 |
| 4,091,994 | 5/1978 | Madsen | 237/2 B |
| 4,141,754 | 2/1979 | Frauenfeld | 165/5 |
| 4,150,787 | 4/1979 | Braathen | 165/DIG. 12 |
| 4,206,805 | 6/1980 | Beckett | 62/238.6 |
| 4,207,752 | 6/1980 | Schwarz | 165/DIG. 12 |
| 4,255,936 | 3/1981 | Cochran | 62/238.7 |
| 4,290,275 | 9/1981 | Disco et al. | 62/238.6 |
| 4,305,260 | 12/1981 | Backlund | 62/238.6 |
| 4,320,630 | 3/1982 | Uselton et al. | 62/238.6 |
| 4,363,221 | 12/1982 | Singh | 62/238.6 |

FOREIGN PATENT DOCUMENTS

| | | | |
|---|---|---|---|
| 41352 | 12/1981 | European Pat. Off. | 237/2 B |
| 2741507 | 3/1979 | Fed. Rep. of Germany | 237/2 B |
| 2806029 | 8/1979 | Fed. Rep. of Germany | 165/DIG. 12 |
| 2391628 | 1/1979 | France | 62/238.6 |
| 2060864 | 5/1981 | United Kingdom | 165/DIG. 12 |
| 2065853 | 7/1981 | United Kingdom | 237/2 B |

Primary Examiner—William R. Cline
Assistant Examiner—John M. Kramer
Attorney, Agent, or Firm—Seed and Berry

[57] ABSTRACT

A practical and economical heat pump system stacks the evaporator, compressor, condenser, and expander to use heat from household wastewater more efficiently and effectively. A novel wastewater storage tank treats the wastewater to remove particulates while it supplies its warmest water to the evaporator to provide heat to the refrigerant in the heat pump unit. Heated water exiting the condenser is stored in a separate tank, such as an ordinary hot water heater. The system automatically ensures that the wastewater does not freeze in a substantial amount in the evaporator.

13 Claims, 5 Drawing Figures

HEAT PUMP SYSTEM USING WASTEWATER HEAT

DESCRIPTION

TECHNICAL FIELD

This invention relates to a heat pump system for heating water for household use which efficiently uses the heat from home wastewater as a primary source of heat.

BACKGROUND ART

Energy conservation assumes an ever more important place in today's technology. Increased fuel costs make it desirable to use energy efficiently. A heat pump system, especially one which capitalizes on the use of what would otherwise be waste heat, would be a desirable conservation unit.

Commercially available heat pump systems usually use heat from the ambient air or from the discharge of an air conditioner to heat water for household use. These systems are impractical or infeasible in colder climates. Because conservation is particularly important in the colder climates, an alternative system is desirable.

In U.S. Pat. No. 2,575,325, a heat pump system is capable of supplying heated water for home use with increased efficiency. The system utilizes the heat of waste liquids generated when the heated water has been used and is being discharged. Alternatively, heat from an air conditioner may be used. Heat exchange between the refrigerant and wastewater occurs in a liquid discharge receiver vessel. If the wastewater flows directly through the receiver vessel, an excessively costly heat exchanger is required. If the wastewater flow is slowed or stopped, particulates in the water will settle, in some circumstances causing the vessel and lines to become clogged.

In U.S. Pat. No. 2,484,371, a pump utilizing the heat of liquids, especially waste products, provides space heating for the interior of a building. The pump uses sewage as its primary heat source. Use of this untreated waste product will lead to heat exchanger and drain line fouling and clogging. The heat exchanger coil is directly immersed in the liquid waste so that efficient heat transfer is possible at all times (col. 3, lines 66–71).

In U.S. Pat. No. 2,751,761, a combination heat pump and water heater uses the ground as a source of heat from which to heat water for home use.

In their book, *Chemical Engineering Thermodynamics, The Study of Energy, Entropy, and Equilibrium* (§ 7.11), Balzhiser, Samuels, and Eliassen discuss the basic thermodynamic principles of a heat pump. In particular, at pages 282–283, the thermodynamic efficiency of a home heat pump air conditioner using Freon-22 as a working fluid to provide 36,000 Btu/hr of cooling capacity is calculated, showing about a 45,000 Btu/hr condenser load (heating capacity).

DISCLOSURE OF INVENTION

To provide an economical and practical system for household use, the heat pump of this invention places two heat exchange elements and a compressor in close proximity so that the full advantage of the heat of the wastewater and operating equipment can be used to heat water for household use. The closed refrigeration loop of the heat pump is housed in a single unit. A condenser is positioned above an evaporator with a compressor atop the stack. An expander, such as a throttle valve, connects the condenser and evaporator. In this integral unit, more efficient heat transfer is possible. Losses from one element are more easily contained and used as input heat for other elements. The unit is easily installed or retrofit into a home.

Another novel feature of this invention is an improved wastewater storage tank, including a conical mesh to treat the inlet wastewater to remove sediment, such as hair, lint, and other particulates. The treated wastewater is circulated to the evaporator by drawing warm wastewater from the top of the storage tank. After passing through the evaporator, the cooled wastewater is recycled to the storage tank, where it enters to displace warmer water upwardly in the tank. The conical mesh is easily cleaned with a jet ejector nozzle which flushes the particulates from the mesh into the tank. The tank fitting contains an additional jet ejector nozzle which pushes the particulates out the drain.

Yet another novel feature of this invention is a design which substantially eliminates the possibility of evaporator freeze-up. Refrigerant automatically collects as a liquid in the lowest coils of the evaporator when less cooling is desired.

BEST MODE FOR CARRYING OUT THE INVENTION

This description incorporates by reference U.S. Pat. No. 2,575,325 and Balzhiser, Samuels and Eliassen, *Chemical Engineering Thermodynamics*, §7.11 (Prentice-Hall, Inc. 1972) to supplement its discussion of heat pumps.

The heat pump system of this invention places the common elements of a heat pump (an evaporator, a compressor, a condenser, and an expander) in close proximity within a single unit so that the heat of household wastewater and the mechanically generated heat and electrical losses of the components may be efficiently used to heat water for the home. Wastewater is collected from sinks, showers, and washing machines and is stored in an insulated storage tank. Particulates and other sediment, such as hair or lint, are filtered from the wastewater before the wastewater is circulated to an evaporator. In the evaporator, the wastewater transfers its heat to a refrigerant, such as Freon-22 (a fluorinated hydrocarbon sold by the "Freon" Products Division of E. I. duPont de Nemours and Co., Inc.). The temperature of the refrigerant, which leaves the evaporator, is further increased in a compressor. Then, the heated refrigerant transfers its heat to household water in a condenser and the household water is stored.

Figure 1:
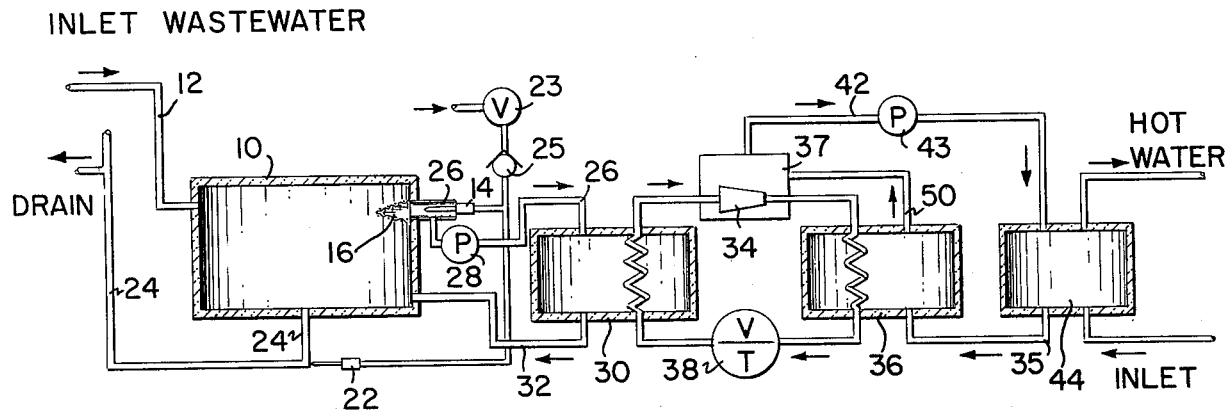
FIG. 1 is a schematic of a heat pump system of this invention.
Figure 2:
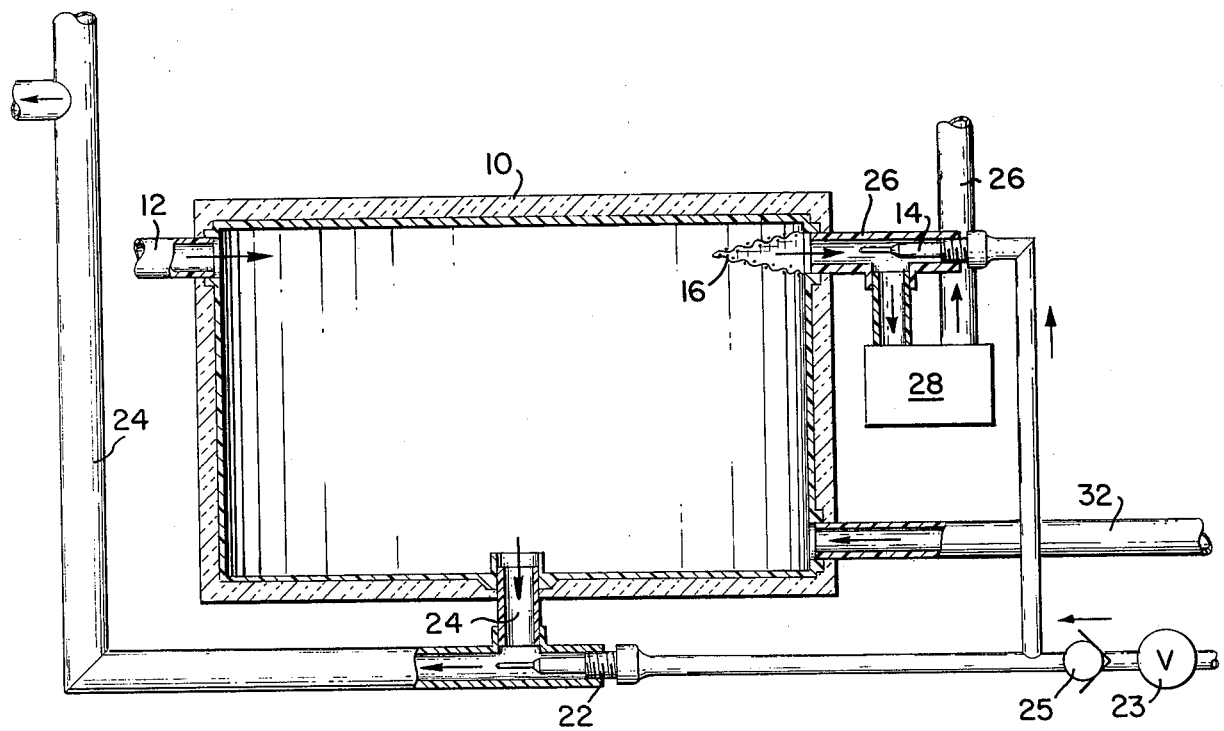
FIG. 2 is a schematic cross-section of a preferred wastewater storage tank.

In FIG. 1, the wastewater enters near the top of an insulated storage tank 10 through collection line 12. Because the storage tank 10 is positioned as a trap in the household plumbing system, water will collect in the tank 10 rather than drain. Newly entering water will displace stored wastewater. The newly entering water will normally be the warmest water in the tank (approximately 35° C.). To insure that this warmest wastewater is used in the heat pump, a wastewater circulation outlet 26 is located near the top of the storage tank 10 to draw water off the top of the tank. A pump 28 is used to push the wastewater through the evaporator 30 and back into the storage tank 100 through a wastewater circulation inlet 32 located near the bottom of the tank.

The wastewater which returns from the evaporator 30 will be cooler than the water in the tank 10 and will displace warmer water upwardly in the tank or will drain through drain 24 when new wastewater enters the top of the tank. The warmest water is used for heat exchange, recycling is easily achieved to insure that the available heat is used, and the coolest wastewater is automatically drained from the storage tank 10.

A conical mesh 16 is positioned to filter the wastewater before it enters the pump 28. The mesh 16 prevents fouling of the circulating pump 28, the evaporator (heat exchanger) 30, and the interconnecting lines 26 and 32. A jet ejector nozzle 14 is positioned behind the conical mesh 16 so that water forced through the nozzle will clean sediment, such as lint, hair, and other particulates, from the mesh 16. A second jet nozzle 22 is positioned in drain 24 to eject sediment down the drain 24 and to prevent plugging of the drain. The jet nozzles 14 and 22 are connected to a supply line valve 23 which is activated periodically either manually or automatically. A check valve 25 is also installed in the supply line to preclude any possibility of wastewater entering the fresh water system because of the ejector nozzles 14 and 22.

In the evaporator 30, heat is exchanged between the wastewater and a refrigerant. The entering wastewater ordinarily will have a temperature of about 35° C. while the refrigerant will be a liquid-gas mixture at about 4° C. The refrigerant will gain heat so that it exits as a pressurized gas at about 4° C. The absorbed heat will be used to overcome the latent heat of the Freon-22 refrigerant, raising the enthalpy of the refrigerant from about 45 Btu/lb$_m$ to 108 Btu/lb$_m$. In the compressor 34, saturated refrigerant vapor leaving the evaporator 30 is superheated to achieve a high-pressure gas having an enthalpy of about 125 Btu/lb$_m$. This gas is passed through the condenser 36, where the refrigerant transfers its heat to inlet household water. The water enters through inlet 35 and is heated from about 13° C. to about 49° C. while the refrigerant loses its superheat, and then condenses at a constant pressure and temperature. Since the refrigerant and the water, preferably, pass through the condenser (heat exchanger) 36 in counter flow, it is possible to raise the household water temperature, as the water passes the superheated section, above the temperature that would normally be achieved by the condensing temperature of the refrigerant. Next, the water enters the compressor housing 37, where it absorbs additional heat that is generated by the mechanical and electrical losses associated with the compressor 34. The water then exits via line 42 through pump 43 into an insulated storage tank 44. The refrigerant is recirculated to the evaporator 30 through an expander 38, such as a throttling valve, expansion valve, or capillary tube, completing its heat pump, closed refrigerant loop.

Because the wastewater storage tank 10 is designed to allow recycling of the wastewater, the heat pump need not use all the wastewater's heat in a single pass through the unit. In fact, ordinarily the wastewater will be recycled through the evaporator for about thirty minutes. Initially, the driving force across the evaporator 30 will be about 30° C., but as the wastewater cools, the driving force will diminish.

Figure 3:
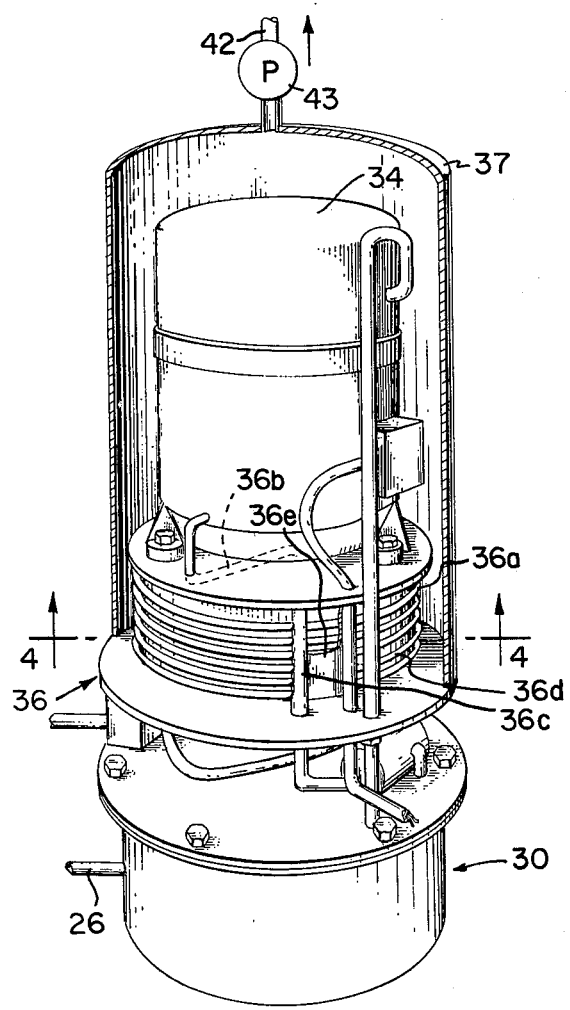
FIG. 3 is a schematic of a heat pump unit of this invention.
Figure 4:
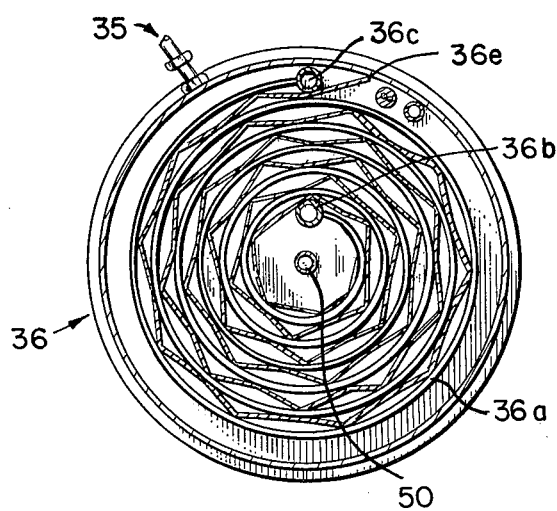
FIG. 4 is a detail showing a cross-section through a preferred coil tube heat exchanger used in the heat pump.

The evaporator 30 and condenser 36, preferably, are counter flow, spiral coil heat exchangers (as shown in FIGS. 3 and 4). The exchanger for the condenser 36 has a plurality of coils 36a arranged vertically with a header 36b to distribute the refrigerant to the various coils 36a. A second header 36c collects the refrigerant as it exits from the coils. FIG. 3 shows the condenser 36 with its outside cover partially cut away. Water enters through outlet 35 and circulates inwardly in a spiral (confined by baffle 36e). At the innermost portion of the spiral, a central hollow 50 serves as a collection means to allow exit of heated water into the compressor housing 37. The evaporator 30 is analogous, except that wastewater flows around the coils.

Figure 5:
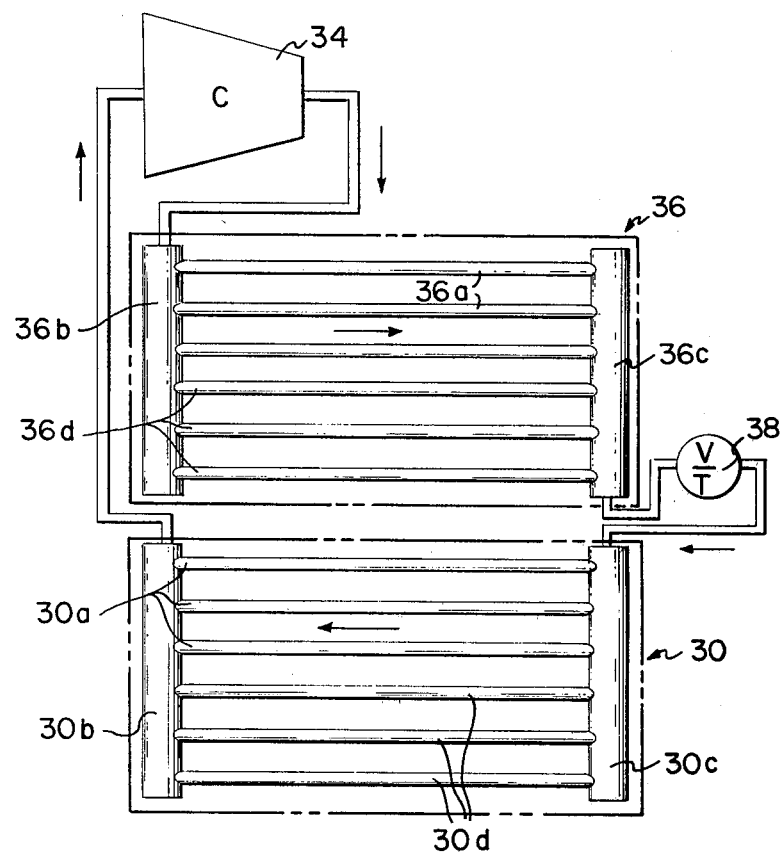
FIG. 5 is a schematic of the heat pump system of FIG. 1.

The tiered coils are especially useful to prevent freezing of the wastewater in the evaporator 30. As the wastewater's temperature in the evaporator 30 approaches freezing, the driving force (temperature difference) across the heat exchanger will approach zero. Only a small amount of refrigerant will be vaporized, so refrigerant will collect as a liquid in the evaporator 30. By properly sizing the header 30b and lowermost tubes 30d of the evaporator 30 to serve as a reservoir and by adjusting the amount of refrigerant charge, it is possible to adjust the system so that (at a predetermined evaporator temperature), a sufficient amount of the refrigerant will exist as a liquid in the header 36b and lower tubes 36d (FIG. 3 and FIG. 5) of the condenser's heat exchanger that sufficient pressure cannot be developed to cause refrigerant condensation in the condenser 36. At this point, the refrigerant passes through the expander 38 (throttling valve) as a gas, then passes through the topmost tubes 30a of the evaporator 30 as a gas, and continues to circulate through the compressor 34 and topmost tubes 36a of the condenser 36 as a gas. In this condition, little or no heat is taken from the wastewater. Only an insubstantial amount of wastewater freezes, while the hot water continues to be heated by the energy losses from the compressor 34. During this infrequent mode of operation, the heat pump functions with the same efficiency as an electrical resistance heater.

To further explain the antifreezing design, under normal operating conditions, the quantity of refrigerant charged to the system should be that amount which fills both the evaporator 30 and condenser 36 with approximately 50% gas and 50% liquid. As the incoming temperature of the wastewater entering the evaporator 30 decreases, the driving force in the heat pump system subsequently is reduced. The vaporization rate in the evaporator 30 will be reduced, causing flow of more liquid to the evaporator 30 to attempt to maintain the vaporization rate. The additional liquid will increase the ratio of liquid-to-gas in the evaporator 30 and will, consequently, reduce the ratio of liquid-to-gas in the condenser 36. The adjustment of the liquid-to-gas ratios in the evaporator 30 and condenser 36 will continue until the inlet wastewater temperature reaches its freezing temperature. Then, a film of ice will begin to form on the evaporator tubes. This film will further reduce the vaporization rate and will lead to a further increase in the liquid-to-gas ratio in the evaporator 30.

The inlet header 30c and the collection header 30b on the evaporator 30 are sized to serve as reservoirs to hold liquid refrigerant so that, when all the liquid is in the evaporator 30, the liquid level will remain below the topmost tubes 30a. Although the heat pump's control valve (not shown) will call for additional liquid to flow from the condensor 36 to the evaporator 30, only gas will be available. This gas will pass through the topmost tubes 30a and will return to the compressor 34 and condenser 36 without removing heat from the wastewater. Thus, the freezing of the wastewater will stop before the lines 26 and 32 are blocked or the evaporator 30 is damaged. Household water in the condenser 36 and compressor housing 37 will continue to be heated by the compressor energy and motor losses, and the household water will be heated much like a resistance water heater.

Because those skilled in the art will recognize modifications to the specific embodiments shown and described which do not depart from the principles of this invention, this invention should not be limited to the specific embodiments unless limitation is necessary due to the teachings of the prior art or the nature and spirit of the appended claims.

I claim:

1. A heat pump system for heating water through the efficient use of heat from home wastewater while automatically avoiding freezing of the wastewater, comprising a plumbing network having:
   (a) a wastewater storage tank to collect and circulate wastewater;
   (b) a consolidated heat pump unit having a closed refrigeration loop, including:
      (i) an evaporator, at the bottom of a stack, to exchange heat between the wastewater and a refrigerant,
      (ii) a compressor, at the top of the stack, connected to the evaporator,
      (iii) a condenser, between the evaporator and compressor, connected to the compressor to exchange heat between the refrigerant and household water, and
      (iv) an expander connected to the condenser and evaporator to close the loop; and
   (c) a heated water storage tank to collect household water heated in the condenser,
   wherein the compressor and condenser are submerged in a water vessel so that household water in the vessel absorbs additional heat from the mechanical and electrical losses of the compressor, after the water leaves the condenser.

2. The system of claim 1, further comprising a means for pumping the wastewater to the evaporator.

3. The system of claim 1 wherein the evaporator comprises a spiral coil heat exchanger, having a plurality of coils.

4. The system of claim 1 or claim 3 wherein the condenser comprises a spiral coil heat exchanger, having a plurality of coils.

5. The system of claim 3 wherein the spiral coil heat exchanger is capable of holding the entire liquid refrigerant of the system while allowing passage of gas through the compressor, condenser, and expander, thereby ensuring that wastewater will not freeze in substantial amounts in the evaporator.

6. The system of claim 1 wherein the wastewater storage tank comprises
   (a) an inlet for wastewater positioned near the top of the tank so that inlet wastewater displaces stored wastewater while remaining near the top of the tank,
   (b) an outlet for the tank positioned to receive displaced wastewater as a drain and making the storage tank into a trap for the wastewater,
   (c) a wastewater circulation outlet positioned near the top of the vessel to carry the warmest wastewater in the tank to the evaporator,
   (d) a filter to clean sediment from the wastewater before the wastewater circulates to the evaporator, and
   (e) a wastewater recycle inlet positioned near the bottom of the tank to carry wastewater back to the tank from the evaporator.

7. A heat pump system for heating water through the efficient use of heat from home wastewater while automatically avoiding freezing of the wastewater, comprising:
   (a) a wastewater storage tank having:
      (i) a storage vessel, acting as a trap, including an inlet and a drain outlet so that inlet wastewater displaces stored wastewater,
      (ii) a wastewater circulation line positioned near the top of the vessel,
      (iii) a wastewater recycle inlet positioned near the bottom of the vessel, and
      (iv) a filter to clean sediment from the wastewater before the wastewater circulates to an evaporator of the heat pump unit;
   (b) a consolidated heat pump unit having a closed refrigeration loop, including:
      (i) a spiral coil, counter flow heat exchanger functioning as an evaporator to exchange heat between the wastewater and a refrigerant, and positioned at the bottom of a stack;
      (ii) a compressor connected to the evaporator and positioned at the top of the stack;
      (iii) a spiral coil, counter flow heat exchanger functioning as a condenser connected to the compressor to exchange heat between the refrigerant and water, and positioned between the evaporator and compressor in the stack; and
      (iv) an expander connected to the condenser and to the evaporator to complete the regrigerant loop, wherein the compressor and condenser heat exchanger are submerged in a water vessel where the household water absorbs additional heat from the mechanical and electrical losses of the compressor, after the water leaves the condenser;
   (c) circulation means connecting the wastewater storage tank and heat pump unit, including a pump;
   (d) inlet means for household water to be heated in the heat pump;
   (e) a heated water storage tank to collect heated household water leaving the condenser; and
   (f) circulation means connecting the heat pump unit and the heated water storage tank.

8. The system of claim 7 wherein the heated water storage tank is a converted hot water heater.

9. The system of claim 7 wherein each heat exchanger in the heat pump unit has a plurality of spiral coils for the refrigerant, a header to split refrigerant flow into the several coils, collection means for the refrigerant exiting from the coils, and a baffle separating the wrapped layers of coils in the spiral.

10. The system of claim 9 wherein the evaporator heat exchanger is capable of holding the entire liquid refrigerant of the system while allowing passage of gas through the compressor, condenser, and expander, thereby ensuring that wastewater will not freeze in substantial amounts in the evaporator.

11. The system of claim 6 or 7 wherein the wastewater storage tank further has a jet nozzle to allow cleaning of particulates from the filter.

12. The system of claim 6 or 7 wherein the wastewater storage tank further has a jet nozzle in the drain outlet to allow cleaning of particulates and sediment out of the drain outlet.

13. The system of claim 7 further comprising a jet nozzle for cleaning sediment from the filter and a jet nozzle within the drain outlet for cleaning particulates and sediment from the tank, wherein both nozzles are simultaneously actuable to clean the tank.

* * * * *